United States Patent [19]
Oleck et al.

[11] 3,867,309
[45] Feb. 18, 1975

[54] CATALYST COMPOSITION FOR REMOVING NOXIOUS COMPONENTS FROM A GASEOUS STREAM

[75] Inventors: Stephen M. Oleck, Moorestown; William A. Stover, Woodbury, both of N.J.

[73] Assignee: Mobil Oil Corporation, New York, N.Y.

[22] Filed: Aug. 24, 1972

[21] Appl. No.: 283,593

[52] U.S. Cl............ 252/455 R, 252/457, 252/460, 252/462, 252/466 B, 252/466 PT, 252/471, 423/213
[51] Int. Cl........................ B01j 11/40, B01j 11/08
[58] Field of Search............ 252/477 R, 459, 455 R, 252/460, 466 PT, 466 B, 462; 423/213

[56] References Cited
UNITED STATES PATENTS

| | | | |
|---|---|---|---|
| 3,495,950 | 2/1970 | Barber et al. | 252/477 R |
| 3,502,596 | 3/1970 | Sowards | 252/477 R |
| 3,565,830 | 2/1971 | Keith et al. | 252/477 R |

Primary Examiner—C. Dees
Attorney, Agent, or Firm—Charles A. Huggett; Raymond W. Barclay; Dennis P. Santini

[57] ABSTRACT

A highly active, stable and sulfur-resistant catalyst composition useful for substantially reducing the amount of carbon monoxide, hydrocarbons, nitrogen oxide and other noxious components in a gaseous stream is provided. Said catalyst composition comprises a specific refractory support material selected from the group consisting of (1) an alumina having a particle density of from about 0.3 to about 1.5 g/cc, a packed density of from about 0.2 to about 0.8 g/cc and a surface area of from about 10 to about 300 m$^2$/g and (2) a monolithic ceramic having an external surface area of from about 100 to about 900 ft$^2$/ft$^3$, a bulk density of from about 10 to about 50 lb/ft$^3$ and from about 2 to about 500 channels per square inch, said refractory support material having deposited thereon from about 0.01 to about 10 weight percent palladium and from about 0.05 to about 20 weight percent metal selected from the group consisting of rare earth, iron, manganese and zinc. The catalyst composition of this invention is effective at lower catalyst bed temperatures than other similar compositions, thus making it valuable when said gaseous stream is the exhaust effluent of an internal combustion engine during low-temperature operation, e.g. engine start-up. The catalyst composition also has excellent stability to aging in internal combustion engine exhaust effluent, even when the fuel to said engine contains up to 1000 ppm sulfur.

17 Claims, No Drawings

CATALYST COMPOSITION FOR REMOVING NOXIOUS COMPONENTS FROM A GASEOUS STREAM

BACKGROUND OF THE INVENTION

1. Field Of The Invention

This invention relates to a novel oxidation catalyst composition. Moreover, it relates to a novel method of use of said catalyst composition for substantially reducing the amount of noxious components entrained in a gaseous stream such as carbon monoxide, nitrogen oxide, hydrocarbons and combustible non-hydrocarbons. Further, and more particular, it relates to the above method for reducing the amount of said noxious components in the exhaust effluent of an internal combustion engine.

2. Discussion Of The Prior Art

With the advent of the field of ecology in more recent times there has been an increasing emphasis upon the purification of automobile engine exhausts. Specifically, some of the components of such exhaust systems which are most odious or intolerable are entrained carbon monoxide, hydrocarbons and nitrogen oxide. It has long been desired to prepare a catalyst system useful in an automobile exhaust system which will convert entrained hydrocarbons to less noxious components. To this end many systems have been prepared, most of which involve an inorganic oxide reactant supported on an inorganic oxide support. To date, no really commercial exhaust catalyst composition or system has been provided which will not only oxidize the carbon monoxide, but enable the reduction of the noxious hydrocarbons, combustible non-hydrocarbons and nitrogen oxide entrained in the exhaust gases to acceptable levels. To be commercially attractive as an automobile exhaust gas catalyst, said catalyst must be highly active, with activity at low operating temperature, stable to aging and resistant to sulfur which may be introduced to the catalyst via the automobile engine fuel.

Specifically, various catalyst systems have been proposed. U.S. Pat. No. 3,428,573 discloses the use of a copper oxide-platinum catalyst supported upon clay and an alumina gel all combined with a form of crystalline alumina. U.S. Pat. No. 3,072,458 discloses the use of platinum and copper on a support material, for instance, alumina. U.S. Pat. No. 3,503,715 discloses the use of an exhaust catalyst system of two beds. The first bed comprises platinum on alumina treated with an alkaline metal. The second bed comprises platinum on alumina. U.S. Pat. No. 3,637,344 teaches a method of exhaust gas treatment comprising high temperature, e.g. in excess of 500°F, contact with a catalyst comprised of alumina impregnated with both ruthenium and iridium. Other patents in this field include U.S. Pat. Nos. 3,540,838 and 3,409,920; British Pat. Nos. 1,009,609; 942,841 and 1,304,621 and others. None of these provides the specific catalyst composition which gives the low temperature, e.g. about 300°F, results in terms of reducing the amount of carbon monoxide, noxious hydrocarbons, combustible non-hydrocarbons and nitrogen oxide as the present invention. None of these provides a catalyst composition with the low temperature activity, stability and sulfur-resistence as the present invention.

SUMMARY OF THE INVENTION

This invention, broadly, relates to a highly active, stable, sulfur-resistant catalyst composition comprising a specific refractory support material selected from the group consisting of an alumina having a particle density of from about 0.3 to about 1.5 g/cc, a packed density of from about 0.2 to about 0.8 g/cc and a surface area of from about 10 to about 300 m$^2$/g and a monolithic ceramic having an external surface area of from about 100 to about 900 ft$^2$/ft$^3$, a bulk density of from about 10 to about 50 lb/ft$^3$ and from about 2 to about 500 channels per square inch, said support having deposited thereon from about 0.01 to about 10 weight percent palladium and from about 0.05 to about 20 weight percent metal selected from the group consisting of rare earth, iron, manganese and zinc, and to a method of using such a catalyst composition to reduce the noxious component content of a gaseous stream by passing said gaseous stream over said catalyst composition.

DISCUSSION OF PREFERRED EMBODIMENTS

In accordance with the present invention, there is provided a highly active, stable and sulfur-resistant catalyst composition for substantially reducing the amount of noxious components, i.e. carbon monoxide, nitrogen oxide, hydrocarbons and combustible non-hydrocarbons, in a gaseous stream. Said catalyst composition comprises a specific refractory support material selected from the group consisting of an alumina having a particle density of from about 0.3 to about 1.5 g/cc, a packed density of from about 0.2 to about 0.8 g/cc and a surface area of from about 10 to about 300 m$^2$/g, such as, for example, low density pseudoboehmite alumina spheres, and a monolithic ceramic having an external surface area of from about 100 to about 900 ft$^2$/ft$^3$, a bulk density of from about 10 to about 50 lb/ft$^3$ and from about 2 to about 500 channels per square inch, said support having deposited thereon from about 0.01 to about 10 weight percent palladium and from about 0.05 to about 20 weight percent metal, such as, for example, in the form of an oxide, selected from the group consisting of rare earth, iron, manganese and zinc. The alumina preferably has a particle density of from about 0.6 to about 1.0 g/cc, a packed density of from about 0.40 to about 0.65 g/cc and a surface area of from about 100 to about 300 m$^2$/g. The monolithic ceramic preferably has an external surface area of from about 150 to about 850 ft$^2$/ft$^3$, a bulk density of from about 15 to about 45 lb/ft$^3$ and from about 4 to about 300 channels per square inch. The palladium deposited on said support material may be present in the preferable amounts of about 0.05 to about 5 weight percent, and the other metals selected from the group consisting of rare earth, iron, manganese and zinc in the preferable amounts of from about 1 to about 15 weight percent, either singly or in combination with one another.

The monolithic ceramic support material may or may not be alumina. Monolithic ceramic materials useful in the catalyst composition of this invention include, as non-limiting examples, alumina, mullite, cordierite and combinations thereof with one another. When the monolithic ceramic material is not alumina, an amount of alumina may, if desired, be deposited on said material in the amount of from about 1 to about 50 weight percent and more preferably in the amount of from about 5 to about 20 weight percent.

Further physical properties of the monolithic ceramic materials useful in the catalyst composition of this invention include the following:

| Property | Range | Preferred Range |
|---|---|---|
| Percent open area | 40–80 | 50–75 |
| Wall Thickness, inch | 0.001–0.1 | 0.005–0.05 |

Also, the shape of the channels of the monolithic ceramic material may be one or more of various geometric shapes, such as, for example, sinusoidal, square, round, hexagonal, elliptical, parabolical, hyperbolical, rectangular, triangular, cycloidal and hydrocycloidal.

The alumina support material for use in the present invention is of relatively low density and may, as an embodiment, have characteristics of a pseudoboehmitic alumina. Characteristics of a pseudoboehmitic alumina component of the catalyst of this invention are a low $Na_2O$ content, e.g. as low as 0.03 percent by weight and lower; a surface area of from about 200 to about 300 $m^2/g$; and having a significant portion of the total pore volume being constituted by pores within the size range of 120 to 800 Angstrom units. Also, as an embodiment of an alumina for use in the catalyst composition of this invention, that described in U.S. Pat. No. 3,630,670 may be used.

The present invention is particularly useful for decreasing the amount of noxious components, i.e. carbon monoxide, low molecular weight hydrocarbons, nitrogen oxide and combustible non-hydrocarbons in internal combustion engine exhaust effluent streams during start-up of an automobile or other internal combustion engine. The catalyst of this invention has particularly valuable application when the temperature of the engine exhaust gas and catalyst bed are low and the potential of combustible discharge into the atmosphere is high. At low temperatures, it is difficult to convert carbon monoxide and noxious hydrocarbons to their oxidation products. It has been found by testing prior art type catalysts for automobile exhaust systems that during start-up, the most harmful amounts of carbon monoxide and unreacted noxious hydrocarbons are emitted to the air. Existing catalysts have failed to adequately deal with the problem of emission control during engine start-up. The catalyst system of the present invention provides low temperature emission control of combustibles in the exhaust gas and substantially complete overall carbon monoxide and noxious hydrocarbon oxidation at low temperatures.

Also, it has been found that many prior art type catalysts for automobile exhaust systems age rather rapidly, thus proving commercially unattractive. This aging problem is magnified to great extent for many of said prior art type catalysts when the fuel to the internal combustion engine providing the exhaust effluent to be in contact with the oxidation catalyst contains sulfur. The catalyst of the present invention has remarkable aging properties whether or not the internal combustion engine is fed with sulfur-containing fuel.

The palladium and rare earth, manganese, iron or zinc may or may not be codeposited on the refractory support material for the present catalyst to be effective. The palladium may first be deposited on the support followed by deposition of rare earth, iron, manganese and/or zinc or vice versa. Preferably, however, the rare earth, iron, manganese and/or zinc may be deposited prior to calcination which is then followed by deposition of palladium by itself.

When the metal component, i.e. rare earth, manganese, iron or zinc, is provided for deposition in the form of an oxide, it is preferred that the source of such metal oxide be the nitrate solution of said metal. Therefore, a source of cerous oxide is preferably cerous nitrate as opposed to being, for example, the chloride of cerium. Other sources of said metal oxide for use in preparing the catalyst composition of the present invention may be, for example, neodymium nitrate, ferric nitrate, manganous nitrate, zinc nitrate and combinations thereof.

In example of this preferability, the Cold Start Screening Test described hereinafter was employed to measure carbon monoxide conversion at furnace temperatures as listed below over two catalysts. Catalyst A was a catalyst prepared according to hereinafter set forth Example 3 with 0.2 weight percent palladium and 4 weight percent rare earth oxide. Catalyst B was the same catalyst prepared by using rare earth chloride as the source of rare earth oxide.

| Catalyst | A | B |
|---|---|---|
| Furnace Temp., °F | Co Conversion, | Volume % |
| 200 | 0 | 0 |
| 250 | 2 | 0 |
| 300 | — | — |
| 350 | 24 | 0 |
| 400 | 99 | 0 |
| 450 | — | 0 |
| 500 | — | 4 |
| 550 | — | 89 |

Non-limiting examples of metal components for use in the catalyst compositions of the present invention are as follows: lanthanum, cerium, praseodymium, neodymium, samarium, gadolinium, yttrium, iron, manganese, zinc and combinations thereof with one another.

In order to more fully and in detail illustrate the nature of the present invention, the following examples and performance results are presented.

EXAMPLE 1

(0.5 Weight Percent Palladium, 4 Weight Percent Rare Earth Oxides)

One hundred grams of low density alumina spheres having the following analysis:
- 3.6% loss on ignition
- 14.9 pounds (force) crush strength
- 259 $m^2g$ surface area (BET)
- 0.0% wt on 5 mesh
- 29.1% wt on 6 mesh
- 99.7% wt on 8 mesh
- 0.52 g/cc bulk density were placed in a one-pint jar. The spheres were then impregnated to incipient wetness with 98 ml solution containing 10.6 grams rare earth nitrate hexahydrate, containing about 37.7 weight percent $RE_2O_3$ and having a composition as follows:

| | % wt. |
|---|---|
| $La_2O_3$ | 24 |
| $Ce_2O_3$ | 48 |
| $Pr_6O_{11}$ | 5 |
| $Nd_2O_3$ | 17 |
| $Sm_2O_3$ | 3 |
| $Gd_2O_3$ | 2 |
| $Y_2O_3$ | 0.2 |
| Other | 0.8 |

The impregnated spheres were oven-dried at 250°F and calcined in a shallow dish in a muffle furnace for 4 hours at 1850°F. The calcined spheres were then impregnated to incipient wetness with 80 ml of an 8.5 pH palladium solution prepared by diluting 5.0 ml of a 0.1 gram palladium per ml solution of palladium nitrate to 70 ml with water, adding 80 drops of concentrated (28% $NH_4OH$) ammonium hydroxide solution and adding more water to 80 ml total volume. This was then oven-dried at 250°F and muffle-calcined for 3 hours at 1400°F in flowing air. The product had a packed density of 0.52 g/cc and a crush strength of 8 pounds (averaged for 25 pellets).

EXAMPLE 2

(0.35 Weight Percent Palladium, 4 Weight Percent Rare Earth Oxides)

One hundred grams of the alumina spheres of Example 1 were impregnated with rare earth nitrate solution, dried and calcined in the same manner as that in Example 1. They were then impregnated with 80 ml of 8.5 pH palladium solution prepared by diluting 3.5 ml of a 0.1 gram palladium per ml solution of palladium nitrate to 70 ml, adding 48 drops of concentrated 28% $NH_4OH$ solution and diluting to 80 ml with water. The product was oven-dried at 250°F and calcined for 3 hours at 1400°F in flowing air.

EXAMPLE 3

(0.2 Weight Percent Palladium, 4 Weight Percent Rare Earth Oxides)

Five hundred grams of the alumina spheres of Example 1 were impregnated with 490 ml of solution containing 53 grams of rare earth nitrate hexahydrate of Example 1, oven-dried at 250°F, and calcined 4 hours at 1850°F in shallow dishes in a muffle furnace. The product was then impregnated with 400 ml of solution prepared by diluting 10 ml of a 0.1 g Pd/ml solution of palladium nitrate to 373 ml, adding $NH_4OH$ to 8.5 pH, and diluting to 400 ml with water. The product was ovendried at 250°F and calcined for three hours at 1400°F in flowing air in a muffle furnace. The product composition had a particle density of 0.87 g/cc, a packed density of 0.52 g/cc, a surface area of 92 $m^2/g$ and a crush strength of 8 pounds average.

EXAMPLE 4

(0.1 Weight Percent Palladium, 4 Weight Percent Rare Earth Oxides)

One hundred grams of the alumina spheres of Example 1 were impregnated with rare earth nitrate solution, oven-dried and calcined at 1850°F by the same procedure as Example 1. The product was impregnated with 8.5 pH palladium nitrate solution to 0.1% wt. palladium, oven-dried at 250°F and calcined for 3 hours at 1400°F in the flowing air in a muffle furnace.

EXAMPLE 5

(0.05 Weight Percent Palladium, 4 Weight Percent Rare Earth Oxides)

A catalyst was prepared from 100 grams of alumina spheres by the same procedure as for Example 4 with the exception that half the palladium was employed.

The catalyst compositions of Examples 1–5 were tested for activity in the Cold Start Screening Test involving contact of the exhaust gas from a 2-cylinder, 4-cycle, 33 cubic-inch-displacement internal combustion engine with the catalyst composition contained in the exhaust gas handling system. The Test may be outlined as follows:

Cold Start (Quartz Reactor) Screening Test

| Gas Composition | |
|---|---|
| Carbon monoxide | 2.0 vol.% |
| Oxygen | 4.5 do. |
| Carbon dioxide | 10.0 do. |
| Water | 10.0 do. |
| Hydrocarbons | 350 ppm |
| Nitrogen oxides | 300 ppm |
| Nitrogen & other exhaust components, i.e. hydrogen, aldehydes, oxygenated hydrocarbons, in minor amounts. | Remainder |
| Test Conditions | |
| Catalyst volume | 10.0 cc |
| Gas flow rate | 3.3 liters/minute |
| Nominal space velocity | 20,000 hr-1 |
| Furnace temperature | Held steady about 20 min. at 50°F intervals between about 150 and 550°F for measurement of CO and HC conversions. |

The results of the Cold Start Screening Test are shown in the following tabulation:

TABLE I

COLD START SCREENING RESULTS

| Example | 1 | | 2 | | 3 | | 4 | | 5 | |
|---|---|---|---|---|---|---|---|---|---|---|
| Palladium % wt. | 0.5 | | 0.35 | | 0.20 | | 0.10 | | 0.05 | |
| Furnace Temp., °F | Conv. % CO | Conv. % Hydrocarbon | Conv. % CO | Conv. % Hydrocarbon | Conv. % CO | Conv. % Hydrocarbon | Conv. % CO | Conv. % Hydrocarbon | Conv. % CO | Conv. % Hydrocarbon |
| 200 | — | — | 0 | 0 | 0 | 0 | — | — | | |
| 250 | 8 | 0 | 3 | 0 | — | — | — | — | | |
| 300 | 50 | 20 | 8 | 2 | 4 | 0 | 2 | 0 | | |
| 320 | 84 | 46 | — | — | — | — | — | — | | |
| 340 | 93 | 53 | — | — | — | — | — | — | | |
| 350 | — | — | 91 | 53 | 8 | 3 | 3 | 0 | 0 | 0 |
| 400 | — | — | — | — | 98 | 67 | 7 | 0 | 0 | 0 |
| 450 | — | — | — | — | — | — | 97 | 64 | 6 | 6 |
| 500 | — | — | — | — | — | — | — | — | 97 | 64 |

It is observed from the data of Table 1 that catalytic activity increases with increase in the amount of palladium in the catalyst composition. Each composition contains 4 weight percent rare earth as an oxide.

EXAMPLE 6

(0.2 Weight Percent Palladium, 4 Weight Percent Cerous Oxide)

One hundred grams of the alumina spheres of Example 1 were impregnated with 98 ml of solution containing 10.6 grams cerous nitrate hexahydrate, oven-dried at 250°F and calcined in a muffle furnace for four hours at 1850°F. The calcined spheres were then impregnated to incipient wetness with 80 ml of an 8.5 pH palladium solution prepared by diluting 2.0 ml of a 0.1 gram palladium per ml solution of palladium nitrate to 70 ml with water, adding 36 drops of concentrated (28% $NH_4OH$) ammonium hydroxide solution and adding more water to 80 ml total volume. The product was then oven-dried at 250°F and muffle calcined for 3 hours at 1400°F in flowing air. The product had a packed density of 0.53 g/cc and a crush strength of 10 pounds (average for 25 pellets).

EXAMPLE 7

(0.2 Weight Percent Palladium, 4 Weight Percent Neodymium Oxide)

The procedure for preparing this catalyst was identical to that for Example 6 with the exception that 10.6 grams of neodymium nitrate hexahydrate were used in lieu of cerous nitrate hexahydrate. The packed density was 0.50 g/cc and crush strength was 10 pounds (average for 25 pellets).

EXAMPLE 8

(0.2 Weight Percent Palladium, 4 Weight Percent Yttrium Oxide)

One hundred grams of the alumina of Example 1 were placed in a jar and impregnated to incipient wetness with 98 ml solution containing 13.6 g yttrium nitrate hexahydrate. The impregnated alumina was then oven-dried at 250°F and calcined in a shallow dish in a muffle furnace for 4 hours at 1850°F. Then the calcined product was impregnated to incipient wetness with 80 ml of an 8.5 pH palladium solution prepared by diluting 2 ml of a 0.1 g palladium per ml solution of palladium nitrate to 75 ml into water, adding 32 drops of concentrated (28% $NH_4OH$) ammonium hydroxide solution and diluting with water to 80 ml total volume. The product was then oven-dried at 250°F and muffle calcined for 3 hours at 1400°F in flowing air. The product catalyst had a packed density of 0.50 g/cc and a crush strength of 9 pounds average.

The catalyst compositions of Examples 6, 7 and 8 were tested in the manner of Examples 1–5 with the results in the following tabulation.

TABLE II

COLD START SCREENING RESULTS

| Example Furnace Temp., °F | 6 CO | Hydrocarbon | 7 Percent Conversion CO | Hydrocarbon | 8 CO | Hydrocarbon |
|---|---|---|---|---|---|---|
| 200 | 0 | 0 | 2 | 3 | — | — |
| 250 | — | — | — | — | — | — |
| 300 | 12 | 1 | 11 | 3 | 10 | 3 |
| 350 | 70 | 36 | 49 | 19 | 36 | 10 |
| 400 | 95 | 62 | 97 | 64 | 98 | 63 |

EXAMPLE 9

(0.2 Weight Percent Palladium, 4 Weight Percent Rare Earth Oxides)

One hundred grams of the low density alumina of Example 1 were placed in a one-pint jar and then impregnated to incipient wetness with 98 ml solution containing 10.6 grams rare earth nitrate hexahydrate of Example 1. The impregnated alumina was then oven-dried at 250°F and calcined in a shallow dish in a muffle furnace for 4 hours at 1850°F. Then the calcined alumina was impregnated to incipient wetness with 80 ml of an 8.5 pH palladium solution prepared by diluting 2 ml of a 0.1 gram palladium per ml solution of palladium nitrate to 75 ml with water, adding about 36 drops of concentrated (28% $NH_4OH$) ammonium hydroxide solution and adding more water to 80 ml total volume. The product was then oven-dried at 250°F and muffle-calcined for 3 hours at 1400°F in flowing air. The product catalyst composition had a packed density of 0.52 g/cc and a crush strength of 11 pounds average.

A batch of the catalyst composition prepared according to Example 9 was tested in the above-defined Cold Start Screening Test along with two prior art type oxidation catalysts, i.e. platinum-impregnated alumina and extruded copper chromite-alumina, both prepared according to the procedures following Table III.

TABLE III

COLD START SCREENING RESULTS

| Catalyst Composition Furnace Temp.,°F | Example 9 Conversion, % CO | Copper Chromite-Alumina Conversion, % CO | Platinum-Alumina Conversion, % CO |
|---|---|---|---|
| 250 | 6 | 0 | 0 |
| 300 | 13 | 0 | 0 |
| 350 | 26 | 5 | 0 |
| 400 | 94 | 12 | 1 |
| 450 | — | 39 | 3 |
| 500 | — | 85 | 6 |
| 550 | — | — | 97 |

PREPARATION OF EXTRUDED COPPER CHROMITE-ALUMINA

Fifty seven pounds of water were mixed with 107 pounds of powdered alpha alumina monohydrate (80 lbs. dry basis) in a mixer. The mixture was discharged into containers which were then capped. The containers were placed in a water bath with water temperatures maintained at 200°F for 16 hours. The mixture was then recharged to the mixer and 20 pounds of copper chromite powder were added. Then a mixture of 1 pound polyvinyl alcohol and one pound carboxymethylcellulose were added to the mixture. The total mixture was then extruded to 1/16 inch diameter, dried 16 hours at 250°F in an oven drier and calcined in pots with air for 3 hours at 1400°F. The product, after abrasion to round off edges had the following properties:

| | |
|---|---|
| Packed density, g/cc | 0.80 |
| Particle density, g/cc | 1.33 |
| Crush strength, lb/inch | 55 |

PREPARATION OF PLATINUM-IMPREGNATED ALUMINA

Eleven hundred and thirty five grams of alumina spheres similar to those of Example 1 were soaked in kerosine for one hour, removed, drained and blotted dry to remove excess liquid. One hundred milliliters of chloroplatinic acid solution equivalent to 2.27 grams platinum were sprayed onto the spheres uniformly. They were stream stripped to remove kerosine and finally calcined for 3 hours at 1400°F.

A bath of the catalyst composition prepared according to Example 9 was tested in the above-defined Cold Start Screening Test to investigate the effect of using fuel for the engine containing sulfur. The following tabulation of data generated by said test shows that fuel having a high sulfur content does not inhibit the activity of the catalyst composition of Example 9.

TABLE IV

COLD START SCREENING TEST

| Conditions | 20 PPM Sulfur in Fuel | 1000 PPM Sulfur in Fuel |
|---|---|---|
| Furnace Temp.,°F | Conversion, % CO | Conversion, % CO |
| 250 | 6 | 0 |
| 300 | 13 | 8 |
| 350 | 26 | 65 |
| 400 | 94 | 95 |

Another batch of the catalyst composition prepared according to Example 9 was subjected to the above-defined Cold Start Screening Test to determine stability to aging with fuels containing high levels of sulfur. Since 1000 ppm sulfur is about maximum for automobile fuels marketed in the United States at this time, that is the amount examined as a high level. Along with the catalyst composition of Example 9, the prior art type oxidation catalyst extruded copper chromite-alumina prepared according to the above example was also tested. The following tabulation of data generated by this test indicates that the catalyst composition of Example 9 does not significantly change after 5000 miles of operation with fuel of 20 or 1000 ppm sulfur. However, the prior art catalyst is seriously affected by sulfur in the fuel.

TABLE V

COLD START ACTIVITY TEST AFTER 5000 MILES SIMULATED AGING WITH FUELS CONTAINING 20 AND 1000 PPM SULFUR

| Catalyst Composition | Example 9 Conversion, % CO | | Copper Chromite-Alumina | |
|---|---|---|---|---|
| Furnace Temp.,°F | 20 PPM Sulfur | 1000 PPM Sulfur | 20 PPM Sulfur | 100 PPM Sulfur |
| 400 | 3 | 0 | 3 | 3 |
| 450 | 6 | 8 | 13 | 13 |
| 500 | 96 | 98 | 46 | 18 |
| 550 | — | — | 95 | 54 |
| 600 | — | — | — | 86 |

EXAMPLE 10

(0.2 Weight Percent Palladium, 12 Weight Percent Ferric Oxide)

One hundred grams of the low-density alumina of Example 1 were placed in a jar and coimpregnated to incipient wetness with 98 ml solution containing 65 grams ferric nitrate 0.9 $H_2O$ and 2.1 ml of 0.1 g palladium per ml solution of palladium nitrate. The coimpregnated alumina was then oven-dried at 250°F. and calcined in flowing air for 3 hours at 1400°F.

EXAMPLE 11

(0.2 Weight Percent Palladium, 12 Weight Percent Manganous Oxide)

One hundred grams of the low-density alumina of Example 1 were placed in a jar and coimpregnated to incipient wetness with 98 ml solution containing 52.9 grams of 50 % manganous nitrate solution and 2.1 ml of 0.1 g palladium per ml solution of palladium nitrate. The coimpregnated alumina was then oven-dried at 250°F and calcined in flowing air for 3 hours at 1400°F. The product catalyst composition had a packed density of 0.51 g/cc.

EXAMPLE 12

(0.2 Weight Percent Palladium, 4 Weight Percent Zinc Oxide)

One hundred grams of the alumina spheres of Example 1 were impregnated with 98 ml solution containing 7.3 grams zinc nitrate hexahydrate and 0.20 grams palladium from palladium nitrate solution. The impregnated spheres were oven-dried at 250°F and then calcined with air flowing up through the bed in an electric furnace for 3 hours at 1400°F.

EXAMPLE 13

(0.2 Weight Percent Palladium)

One hundred grams of alumina spheres similar to those of Example 1 were impregnated to incipient wetness with 55 ml of a solution containing 0.20 grams palladium as palladium nitrate, ovendried at 250°F and calcined for 3 hours at 1400°F in flowing air.

The catalyst compositions of Examples 10, 11, 12 and 13 were tested in the above-defined Cold Start Screening Test using the following gas composition and conditions:

| Gas Component | Vol. % |
|---|---|
| CO | 2 |
| $O_2$ | 4.5 |
| $C_3H_6$ (propylene) | 400 ppm |
| $CO_2$ | 10 |
| $H_2O$ | 10(a) |
| $N_2$ | remainder |
| Gas Flow Rate liter/min. | 3.0 |

(a) added by bubbling gas through water at 115°F.

The furnace temperature around the reactor containing the catalyst was lined out at 200°F. The above gas was flowed through the catalyst bed, the bed temperature (near bottom) was measured, and CO and propylene conversions were determined. Furnace temperature was raised in 50°F increments and the step repeated until CO conversion was high or a significant conclusion could be drawn from the results. The results in this test are shown below:

TABLE VI

COLD START SCREENING RESULTS

| Catalyst Composition | Example 10 | | Example 11 | | Example 12 | | Example 13 | |
|---|---|---|---|---|---|---|---|---|
| | Percent Conversion | | | | | | | |
| Furnace Temp.,°F | CO | Propylene | CO | Propylene | CO | Propylene | CO | Propylene |
| 200 | — | — | 0 | — | 6 | 0 | 5 | 0 |
| 250 | 21 | — | 6 | — | 14 | 0 | 8 | 0 |
| 300 | 90 | — | 18 | — | 99 | 97 | 15 | 0 |
| 350 | — | — | 98 | 99 | — | — | 16 | 0 |

These results clearly show the promotional effect of zinc, iron and manganese with palladium impregnated on alumina as compared to palladium impregnated on alumina (Example 13).

In illustrating the excellent effectiveness of the catalyst compositions of this invention with respect to reducing the amount of nitrogen oxides in a gaseous effluent stream, the catalyst composition of Example 3 was subjected to the Cold Start Screening Test with the following gas composition and conditions:

| Gas Component | |
|---|---|
| CO, vol. % | 1.95 |
| Hydrocarbons, ppm | 310 |
| NO, ppm | 290 |
| $O_2$, vol. % | 0.7 |
| $CO_2$, vol. % | 10.1 |
| $H_2O$, vol. % | approx. 10 |
| Space Velocity | = 22,000 hr$^{-1}$ |
| Furnace Temperature | = 600°F |
| The results of said test were as follows: | |
| Conversion of NO | 95% |
| Conversion of CO | 45% |
| Conversion of hydrocarbons | 35% |

In order to illustrate that catalyst compositions comprising metals other than rare earth, manganese, iron or zinc are not as effective as the catalyst compositions of the present invention for reducing the amount of carbon monoxide and noxious hydrocarbons in a gaseous stream, a Catalyst Warm-Up Activity Test, as described below, was performed. The catalyst compositions used in the test for comparison purposes were (A) the catalyst composition of Example 3, and (B) the catalyst composition of Example 14, set forth hereinafter.

CATALYST WARM-UP ACTIVITY TEST

The test apparatus includes a 100 cubic inch bifurcated converter located downstream of a poppet-type diverting valve in the total exhaust system of a 351 cubic-inch displacement engine. Exhaust gas sample taps are located before and after the converter, and temperatures are recorded at the inlet, outlet, and the catalyst mid-bed locations.

Catalyst samples are pre-conditioned for one hour at 40 MPH road load and 1.5 percent CO in an oxidizing atmosphere prior to the activity test. At the end of 1 hour, the exhaust gas is diverted around the converter and the catalyst is then cooled to 70°F using compressed air. The engine raw exhaust conditions are maintained at 1.5 percent CO, 2.5 percent $O_2$, 1000 ppm NO at 40 MPH (Space Velocity = 35,200 hr$^{-1}$), and inlet temperatures of about 900°F while in the cooling mode. After the catalyst is cooled, the exhaust gas is then routed back through the converter, and temperatures and outlet emissions are recorded during the catalyst warm-up period. Catalyst emission reduction efficiencies are then computed on the basis of the stabilized input emission conditions and the catalyst outlet emissions versus time.

EXAMPLE 14

(0.2 Weight Percent Palladium, 2 Weight Percent Silver Oxide)

A quantity of alumina spheres of Example 1 was calcined in an electric furnace for 4 hours at 1850°F. A five hundred gram portion was impregnated with 440 ml of palladium nitrate solution containing 1.0 grams palladium and adjusted to 8.5 pH with 2.6 ml concentrated $NH_4OH$. The product was oven-dried at 250°F. and calcined in an electric muffle furnace with air flowing through the bed for 3 hours at 1000°F. The product was then impregnated with 440 ml of solution containing 15 grams silver nitrate. It was oven-dried again at 250°F and calcined three hours at 1400°F with air flowing through bed.

Results of the Catalyst Warm-Up Test were as follows for:

Catalyst Composition of Example 3

| | Conversion, % | |
|---|---|---|
| Time Seconds | Carbon Monoxide | Hydrocarbons |
| 9 | 69 | — |
| 14 | 85 | — |
| BB | 91 | 54 |
| 36 | 95 | — |
| 43 | — | 74 |
| 68 | — | 81 |
| 225 | 97 | 88 |
| Example 14 | | |
| 16 | 14 | 9 |
| 26 | 30 | 14 |
| 32 | 32 | 18 |
| 40 | 53 | 26 |
| 44 | 53 | 32 |
| 48 | 61 | 41 |
| 61 | 65 | 44 |

-Continued

Catalyst Composition of Example 3

| Time Seconds | Conversion, % | |
|---|---|---|
| | Carbon Monoxide | Hydrocarbons |
| 72 | 65 | 44 |
| 86 | 68 | 50 |
| 215 | 74 | 56 |
| 225 | 76 | 56 |

It is observed that the catalyst of the present invention (Example 3) had warmed up and was very active in converting 69% CO in 9 seconds and over 90% CO in 22 seconds when hydrocarbon conversion was also 54%. The catalyst of Example 14 with silver oxide present, but no rare earth, took 86 seconds to reach 68% CO conversion and almost 215 seconds to reach 56% hydrocarbon conversion. The silver catalyst of Example 14 did not attain over 76% CO conversion during the entire test.

A final specific example in illustration of the catalyst composition of the present invention follows

EXAMPLE 15

(0.35 Weight Percent Palladium, 4 Weight Percent Rare Earth Oxides)

A piece of monolithic ceramic ¾ inch in diameter and 2 inches long was dipped into an alumina dispersion which was prepared by adding 6.0 grams of 70% $HNO_3$ to 844 ml water, and adding 15 grams of powdered alpha alumina monohydrate to 85 ml of the acid solution. After the piece was dipped into the alumina solution, it was dried and held in a muffle furnace at 1000°F for 1 hour. The procedure was repeated until the weight increase after 1000°F calcination was 15 percent. The piece then was dipped into rare earth nitrate solution and calcined for 1 hour at 1000°F. The procedure was repeated a total of four times until the weight increase was 4 percent. The piece was then calcined in a muffle furnace for 4 hours at 1850°F, after which it was dipped into a palladium nitrate 8.5 pH solution containing 0.0016 grams palladium per ml solution, and calcined for 1 hour at 1000°F. The piece was weighed after each dip and after each calcining. The procedure was repeated 16 times until it was indicated 0.35% wt palladium was deposited. It was then calcined for 3 hours at 1400°F in a muffle furnace.

The catalyst composition of Example 15 was subjected to the Cold Start Screening Test used in evaluation of the compositions of Examples 1–5. However, the test evaluation reports gas inlet temperatures rather than furnace temperatures.

The results of such test are compared in the following tabulation with those obtained for a piece of commercial platinum-impregnated monolithic ceramic support.

TABLE VII

COLD START SCREENING RESULTS

| Catalyst Composition | Example 15 | | Platinum-Monolithic Ceramic | |
|---|---|---|---|---|
| Gas Inlet Temp.,°F | Percent Conversion | | | |
| | CO | Hydrocarbon | CO | Hydrocarbon |
| 350 | 4 | 2 | — | — |
| 370 | 6 | 2 | — | — |
| 380 | — | — | 3 | 0 |
| 390 | 14 | 6 | 4 | 0 |
| 400 | 99 | 70 | 6 | 0 |
| 410 | — | — | 10 | 3 |
| 420 | — | — | 13 | 3 |
| 430 | — | — | 22 | 6 |
| 440 | — | — | 96 | 75 |

These results again clearly show the superiority of the catalyst composition of the present invention when compared to a readily available commercial catalyst of similar but different nature.

We claim:

1. A catalyst composition which comprises a refractory support material selected from the group consisting of (1) an alumina having a particle density of from about 0.3 to about 1.5 g/cc, a packed density of from about 0.2 to about 0.8 g/cc and a surface area of from about 10 to about 300 $m^2/g$ and (2) a monolithic ceramic having an external surface area of from about 100 to about 900 $ft^2/ft^3$, a bulk density of from about 10 to about 50 $lb/ft^3$ and from about 2 to about 500 channels per square inch, said refractory support material having deposited thereon from about 0.01 to about 10 weight percent palladium and from about 0.05 to about 20 weight percent of a metal selected from the group consisting of rare earth, iron, manganese and zinc.

2. A composition as defined in claim 1 wherein said support is pseudoboehmitic alumina.

3. A composition as defined in claim 1 wherein said support is alumina characterized by having a particle density of from about 0.6 to about 1.0 g/cc, a packed density of from about 0.4 to about 0.65 g/cc and a surface area of from about 100 to about 300 $m^2/g$.

4. A composition as defined in claim 1 wherein said support is a monolithic ceramic characterized by having an external surface area of from about 150 to about 850 $ft^2/ft^3$, a bulk density of from about 15 to about 45 $lb/ft^3$ and from about 4 to about 300 channels per square inch.

5. A composition as defined in claim 3 wherein said alumina has deposited thereon from about 0.05 to about 5 weight percent palladium and from about 1 to about 15 weight percent of a metal selected from the group consisting of rare earth, iron, manganese and zinc.

6. A composition as defined in claim 4 wherein said monolithic ceramic has deposited thereon from about 0.05 to about 5 weight percent palladium and from about 1 to about 15 weight percent of a metal selected from the group consisting of rare earth, iron, manganese and zinc.

7. A composition as defined in claim 2 wherein said alumina has a $Na_2O$ content of less than about 0.3 percent by weight, a surface area of from about 200 to about 300 $m^2/g$ and has a significant portion of its total pore volume being constituted by pores within the size range of 120 to 800 Angstrom units.

8. A composition as defined in claim 1 wherein said metal is selected from the group consisting of lanthanum, cerium, praseodymium, neodymium, samarium, gadolinium, yttrium, iron, manganese, zinc and combinations thereof with one another.

9. A composition as defined in claim 5 wherein said metal is selected from the group consisting of lanthanum, cerium, praseodymium, neodymium, samarium, gadolinium, yttrium, iron, manganese, zinc and combinations thereof with one another.

10. A composition as defined in claim 6 wherein said metal is selected from the group consisting of lanthanum, cerium, praseodymium, neodymium, samarium, gadolinium, yttrium, iron, manganese, zinc and combinations thereof with one another.

11. A composition as defined in claim 1 wherein said metal comprises a rare earth.

12. A composition as defined in claim 1 wherein said metal is iron.

13. A composition as defined in claim 1 wherein said metal is manganese.

14. A composition as defined in claim 1 wherein said metal is zinc.

15. A composition as defined in claim 11 wherein said metal is cerium.

16. A composition as defined in claim 11 wherein said metal is neodymium.

17. A composition as defined in claim 11 wherein said metal is yttrium.

* * * * *

UNITED STATES PATENT AND TRADEMARK OFFICE
CERTIFICATE OF CORRECTION

PATENT NO. : 3,867,309
DATED : February 18, 1975
INVENTOR(S) : STEPHEN M. OLECK and WILLIAM A. STOVER It is certified that error appears in the above-identified patent and that said Letters Patent are hereby corrected as shown below:

```
Column 1, line 57, "1,304,621" should read --1,034,621--.
Column 5, line 42, "373" should read --375--.
Column 9  line 29, "bath" should read --batch--.
Column 12, line 59, "BB" should read --22--.
Column 13, line 24, "follows" should read --follows:--.
```

Signed and Sealed this twenty-second Day of July 1975

[SEAL]

Attest:

RUTH C. MASON
Attesting Officer

C. MARSHALL DANN
Commissioner of Patents and Trademarks